US005860664A

United States Patent [19]

Smith

[11] Patent Number: 5,860,664

[45] Date of Patent: Jan. 19, 1999

[54] COMBINATION WHEELCHAIR SLEEPER 24-HOUR USE APPARATUS

[76] Inventor: Rosalie Smith, 200 Elmira St., S.W., #406, Washington, D.C. 20032

[21] Appl. No.: 734,237

[22] Filed: Oct. 21, 1996

[51] Int. Cl.[6] .......... B62M 1/14

[52] U.S. Cl. .......... 280/250.1; 280/304.1; 280/647; 108/44

[58] Field of Search .......... 280/250.1, 304.1, 280/638, 647, 649; 297/DIG. 4; 108/11, 13, 14, 44, 45, 46; 5/81.1 R, 626, 627

[56] References Cited

U.S. PATENT DOCUMENTS

| | | | |
|---|---|---|---|
| 2,427,782 | 9/1947 | Hausman | 280/250.1 X |
| 3,964,786 | 6/1976 | Mashuda | 280/250.1 X |
| 4,453,732 | 6/1984 | Assanah et al. | 280/250.1 |
| 4,679,849 | 7/1987 | Torgny | 280/250.1 X |
| 4,685,693 | 8/1987 | Vadjunec | 280/250.1 |
| 4,717,169 | 1/1988 | Shaffer | 280/648 |
| 4,787,104 | 11/1988 | Grantham | 5/66 |
| 4,821,352 | 4/1989 | DiMatteo et al. | 5/81 |
| 4,997,200 | 3/1991 | Earls | 280/304.1 X |
| 5,050,899 | 9/1991 | Stensby | 280/250.1 |
| 5,145,197 | 9/1992 | Gatti | 280/304.1 |
| 5,228,711 | 7/1993 | Summers | 280/304.1 |
| 5,308,028 | 5/1994 | Kornberg | 280/304.1 X |
| 5,333,887 | 8/1994 | Luther | 280/250.1 |
| 5,350,032 | 9/1994 | Smith | 280/304.1 X |
| 5,577,753 | 11/1996 | Pociask | 280/250.1 |

FOREIGN PATENT DOCUMENTS

| | | | |
|---|---|---|---|
| 5-023370 | 2/1993 | Japan | 280/250.1 |

*Primary Examiner*—Kevin Hurley
*Attorney, Agent, or Firm*—Fulbright & Jaworski L.L.P.

[57] ABSTRACT

A novel apparatus which promotes 24-hour independence of a patient is claimed. The apparatus is a combination of wheelchair and sleeper that easily converts from a wheelchair configuration into a bed or other horizontal surface.

15 Claims, 17 Drawing Sheets

COMBINATION WHEELCHAIR SLEEPER 24-HOUR USE APPARATUS

BACKGROUND OF THE INVENTION

1. Field of the Invention

The present invention relates to an improved combination 24-hour wheelchair-sleeper apparatus that is designed to convert from a wheelchair configuration into a generally horizontal sleeping configuration.

2. Description of the Prior Art

In the prior art, convertible beds or wheelchair devices, as well as other invalid transferring arrangements, are known. However, none of the devices of the prior art suggest all of the features of the present invention. In particular, the prior art does not suggest a wheelchair that may convert into a sleeper with additional features that promote total 24-hour independence. The following devices of the prior art are known to Applicant.

U.S. Pat. No. 4,717,169 to Shaffler discloses a wheeled structure that is convertible between a full-sized bed and a wheelchair. However, the Shaffler device does not include a mechanism to facilitate transferring the patient from the bed arrangement onto another like bed.

U.S. Pat. No. 4,787,104 to Grantham discloses a convertible hospital bed that includes a mechanism to assist a patient sitting upright in the bed in moving on and off the bed. Grantham fails to disclose a wheelchair unit that is convertible into a sleeper apparatus.

U.S. Pat. No. 4,821,352 to DiMatteo et al. discloses an arrangement combining a wheelchair with a bed, wherein the bed has a mechanism that assists an invalid from the bed into a wheelchair, with the wheelchair having a mechanism to receive the invalid from the bed. The wheelchair unit of DiMatteo et al. permits transfer of an invalid between a bed and a convertible wheelchair in close proximity to a bedding unit. However, the invention of DiMatteo et al. does not provide accommodation for 24-hour occupation by a patient.

SUMMARY OF THE INVENTION

The present invention relates to an improved combination of wheelchair-sleeper apparatus that addresses the shortcomings of the prior art. The present invention includes the following interrelated aspects and features:

(A) In the first aspect, the combination wheelchair sleeper apparatus may include a frame, a pair of front swivelable wheels, a pair of center wheels, a centered retractable rear wheel, a pair of detachable arm rests, a moveable seat rest which may include a potty opening, leg supports, pivotable footrests, a pivotable backrest, and an adjustable headrest.

(B) The apparatus may be constructed with adjustable leg supports, pivotable footrests and a hinged backrest, all configured to permit the apparatus to be transformed between a wheelchair and a sleeper. In the sleeper position, the leg supports are raised, the footrests are pivoted or folded away, and the backrest is reclined so that the patient may lie in a horizontal position for sleep, transport or transfer.

(C) The combination 24-hour wheelchair-sleeper may also include a wheel assembly that is utilized in the sleeper position. The wheel assembly includes a retractable centered rear wheel that may be used to support the backrest in the reclined position. The wheel assembly may also assist in movement of the apparatus in the sleeper position.

(D) The improved wheelchair-sleeper may also include a means for assisting the transfer of a patient from a wheelchair to an adjacent surface, e.g., abed or horizontal surface. These means may include removable armrests which, when removed, permit one individual or the resident patient to easily transfer to and from the wheelchair-sleeper.

The main object of the present invention is to provide for the total independence of the user of the invention. The 24-hour wheelchair-sleeper apparatus of the present invention is a bedchair, potchair, recliner and wheelchair all in one. It enables the user to adopt a reclined sleeping position, and therefore additionally serves as a bed. The chair is designed to be high enough to slip over a commode, and it may also be fitted with a suspended bedpan. The bedpan may be removed by sliding it out on supporting grooved channels.

The headrest portion of the wheelchair of the present invention is designed to provide full rear and lateral head support.

The present invention is constructed so as to accommodate a dual purpose tray that in one instance may serve as a food tray and in another instance may serve as a reading/writing table top. The tray may be made with sunken receptacles to accommodate drinking and eating utensils. Additionally, the reverse side of the tray unit may be adapted to support reading and writing materials.

The present invention may also exhibit an electrical control from which electronic instructions for desired motions and operational features can be dispatched via conveniently located, patient-operable, switches, dials, buttons, knobs and the like.

The above-described features of the present invention will be better understood upon reading the following detailed description when read in connection with the accompanying figures.

DETAILED DESCRIPTION OF THE PRESENT INVENTION

Figure 1:
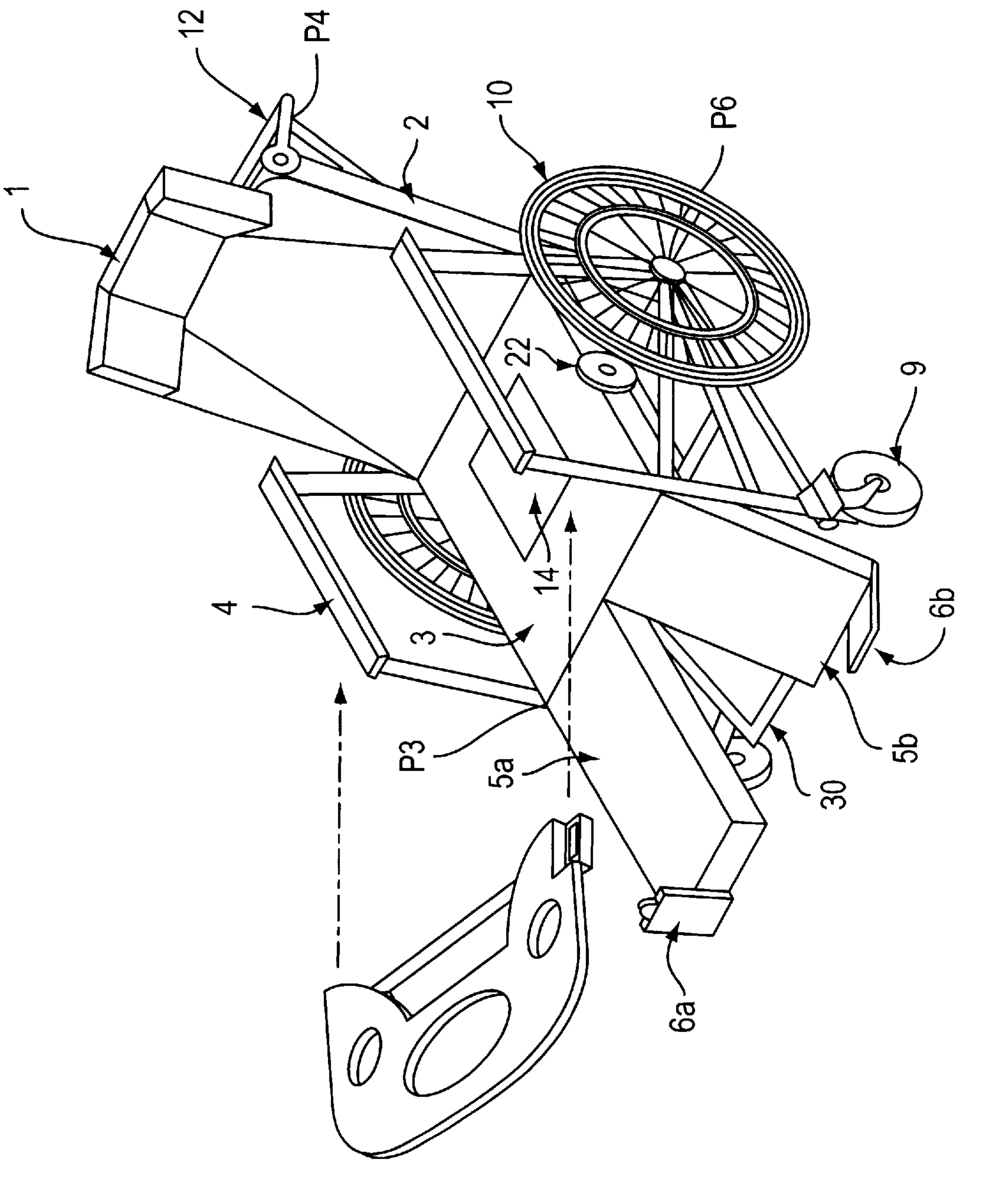
FIG. 1 shows a three dimensional front perspective view of an embodiment of the apparatus according to the invention.

With reference to FIGS. 1–7 the apparatus according to the invention includes an adjustable headrest 1 pivotally attached at P4 to backrest 2 which, in turn is pivotally attached at P2 to seat 3. Leg supports 6*a* and 5*b* may each be independently pivotally attached at P3 to seat 3. Footrests 6*a* and 6*b* may be pivotally attached to leg supports 5*a* and 5*b*, respectively. Footrests 6*a* and 6*b* may be constructed so as to be retractable into leg supports 5*a* and 5*b*.

With reference to FIGS. 2, 3, 5 and 13 it can be seen that the present invention is provided with a rigid frame. The frame members may be constructed of any suitable material of high tensile strength so as to maintain the rigidity and structural integrity of the frame. An example of a suitable material is high carbon surgical steel. The frame may include left and right horizontal support members 25*a* and 25*b*, left and right diagonal support members 26*a* and 26*b*, left and right rear vertical support members 27*a* and 27*b*, and left and right front vertical support members 28*a* and 28*b*. The left and right sides of the frame are connected via a front horizontal support member 29 and the seat 3. In order to provide additional rigidity and resistance to torsional movements, the frame may be provided with left and right lower stabilizing members 30*a* and 30*b*. These members may be joined by a medial transverse member 31. Optionally, the stabilizing members 30*a* and 30*b* may extend forward of the front horizontal support member 29 and be joined by a forward transverse member 32. In a preferred embodiment, a tray 52 may be attached to the tops of stabilizing members 30*a* and 30*b* and may extend from the medial transverse member 31 frontwards to the forward transverse member 32. The tray 52 may be formed of any durable material and may be used for storage of items for the occupant of the wheelchair-sleeper. In a preferred embodiment, the apparatus is equipped with a battery and the battery is attached to the surface of the tray 52.

Figure 13:
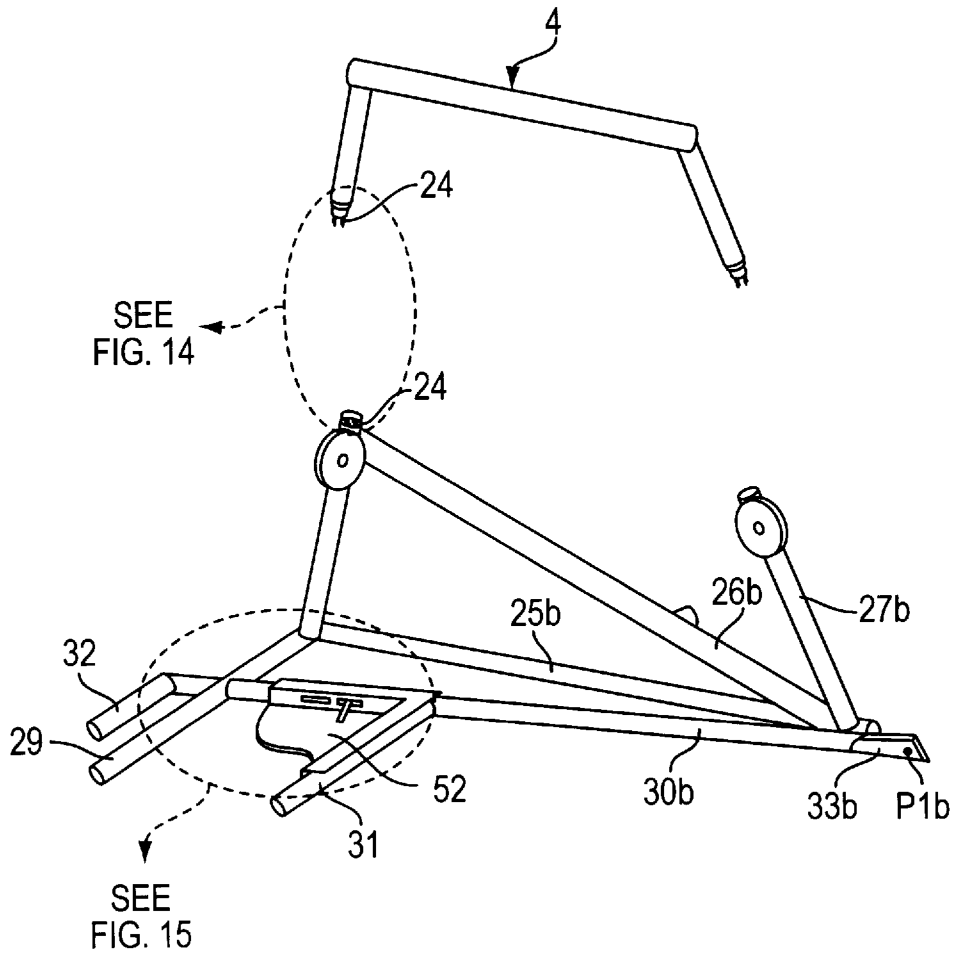
FIG. 13 shows a view of the right side of the frame seen from the left side with the rest of the apparatus cut away.
Figure 14:
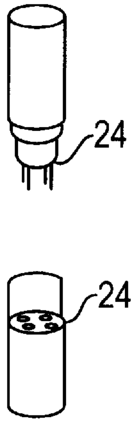
FIG. 14 shows an enlarged view of the electrical connectors shown in FIG. 13.
Figure 15A:
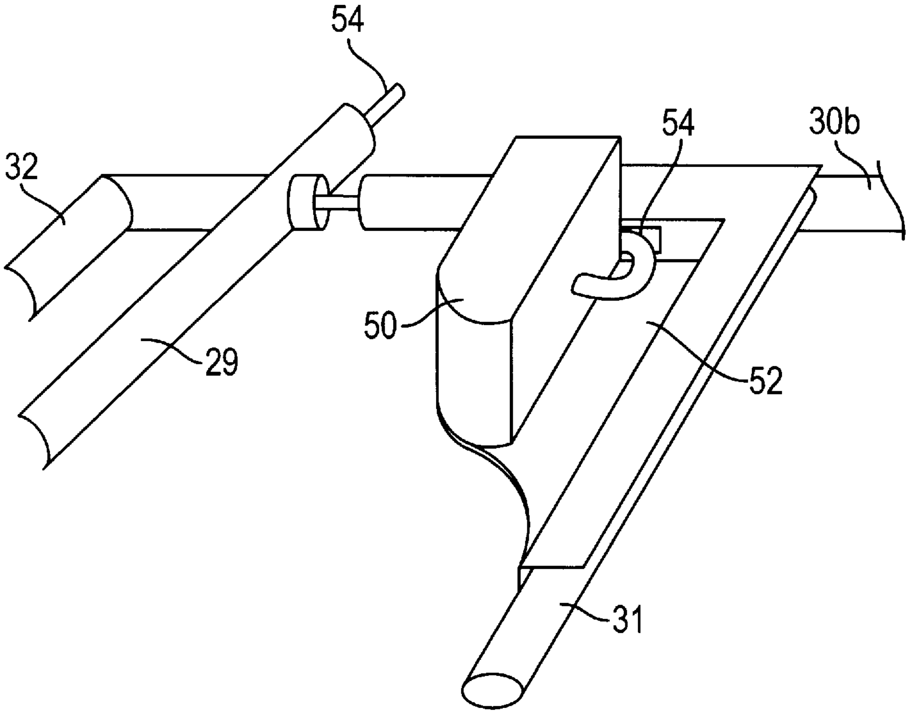
FIG. 15A shows an enlarged exploded view of the frame showing a battery in place on the tray.
Figure 15B:
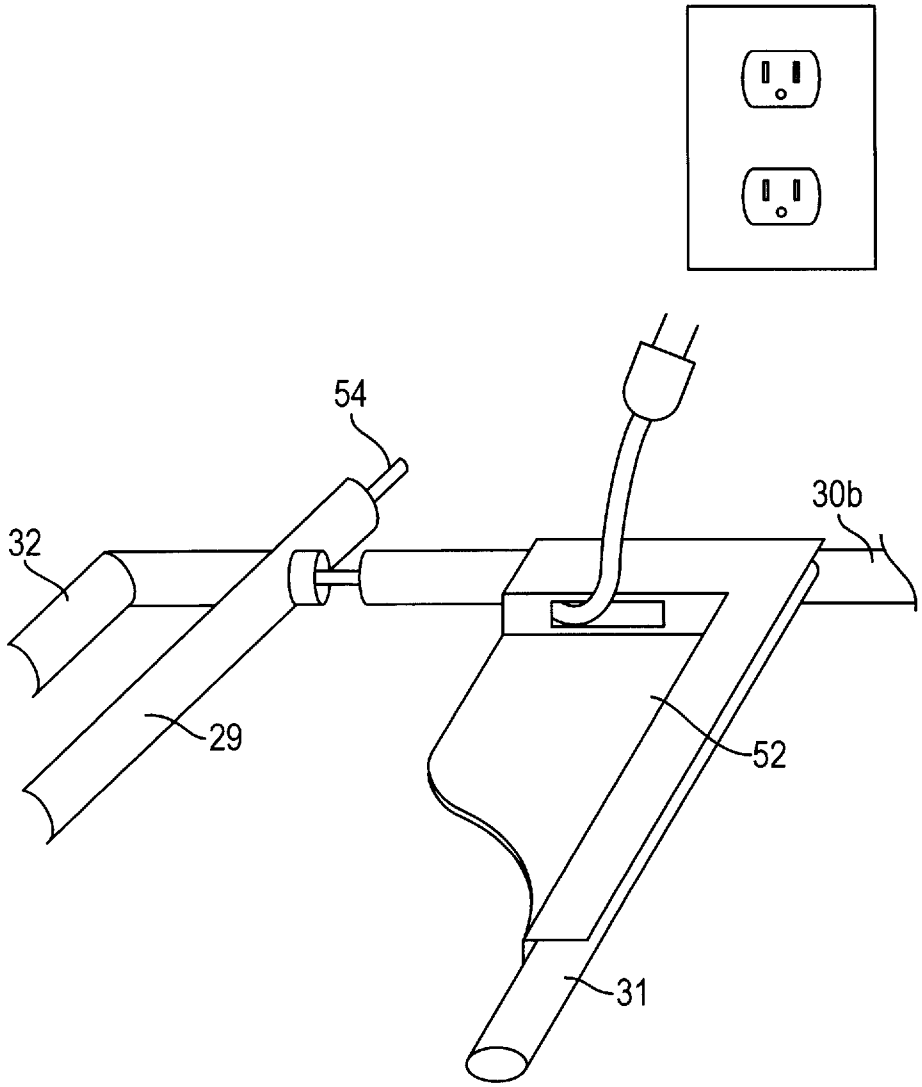
FIG. 15B shows an enlarged exploded view of the frame showing the wiring adapted for use/of a wall plug.
Figure 16:
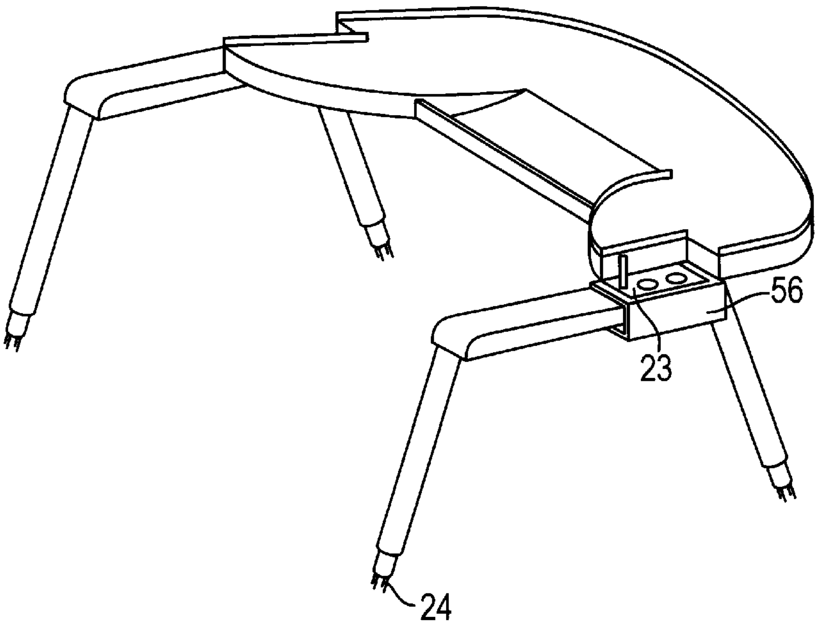
FIG. 16 shows attachment of the tray to the detachable armrests of the present invention. It also shows the electrical control panel and electrical connectors at the base of the armrests.

Removable armrests 4 may be attached to the frame near P2 in the rear and P3 in the front and may be adapted to easily accommodate removable tray/writing accessory 41. To further facilitate transfer of a patient to and from the wheelchair-sleeper, the central wheels 10 may be positioned or dimensioned such that the topmost portion of the wheels do not extend upward beyond the plane of the seat 3. The removable tray/writing accessory 41 may be constructed so as to frictionally fit on the arm rests 4. Optionally, the removable tray/writing accessory 41 may be equipped with clips or other attachment means known to those skilled in the art. It should be easily understood by those in the art that various known types of removable tray accessories may be adaptable to the present apparatus. The removable tray/writing accessory feature is included as an aspect of the 24-hour wheelchair-sleeper apparatus to foster total independence of the user patient. Optionally, the tray accessory may be utilized fully as a dual functioning food tray/reading and writing desk and may accommodate a laptop computer unit. The tray unit may be configured to allow electrical accessories to be fitted to either the right or left sides for fingertip control. As can be seen in FIGS. 13, 14 and 16, the lower portion of the arm rest may be fitted with an electrical connector. According to this embodiment, electricity may be supplied by a battery 50 and conveyed through wires 54 threaded within the frame members to an electrical connector 24 within the frame member at P3. One skilled in the art will recognize that the nature of the electrical connector may be adapted to specific purposes as required. Alternatively, the wires 54 may terminate in a plug 58 which may be plugged into a wall socket as shown in FIG. 15B.

Figure 6:
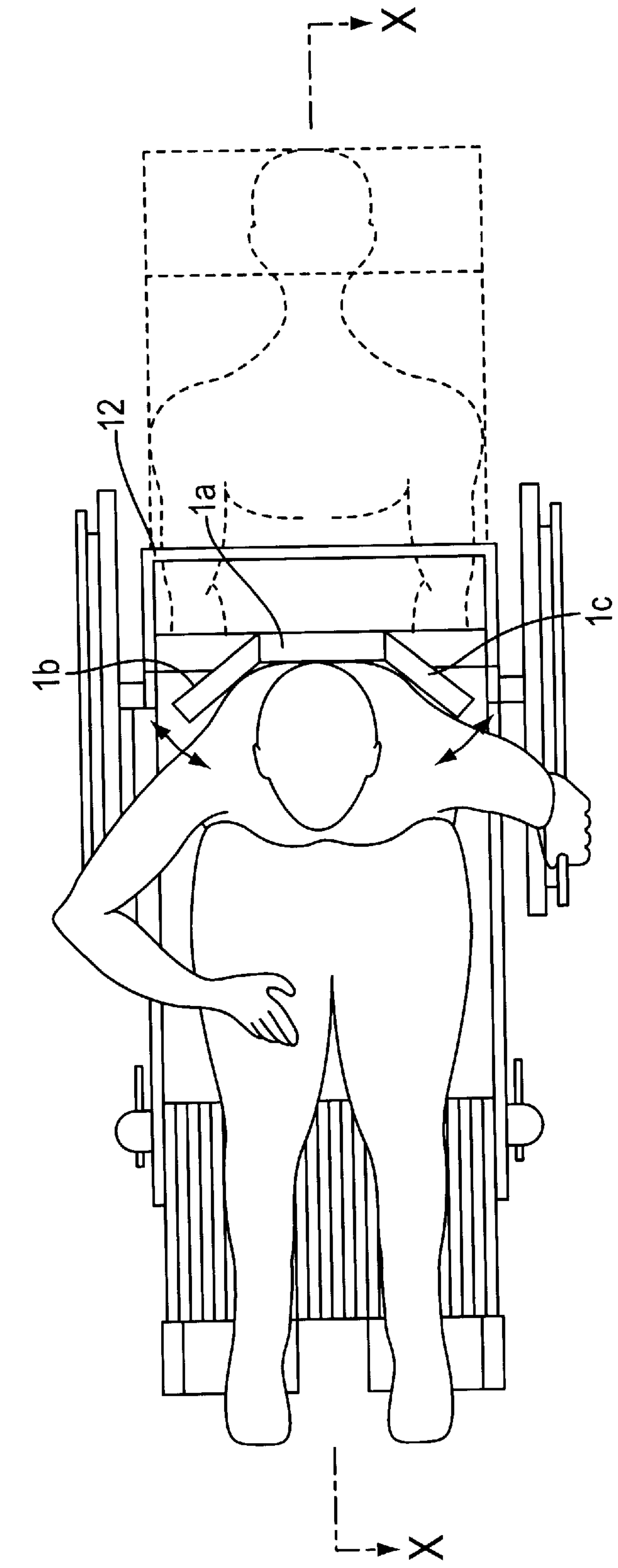
FIG. 6 shows an overhead view of an embodiment of the apparatus according to the invention in the upright position.

The headrest 1 may optionally be constructed of a central portion 1*a* and two adjustable lateral support flaps 1*b* and 1*c* (FIG. 6). According to this embodiment, adjustable lateral support flaps may be adjusted relative to the plane of central portion 1*a* to optionally provide full lateral support. The winged adjustable lateral support flaps may move from the plane of the backrest through varying degrees of adjustment. The lateral support flaps may be adjusted from the plane of the backrest within and up to a 90 degree angle with the plane of the backrest. Optionally, the lateral support flaps may be fitted with a head support band to allow the head of an occupant of the sleeper to be fixed to the backrest and flaps. This will be useful when the occupant is unable to support the weight of his/her head. The backrest 2 of the 24-hour wheelchair-sleeper apparatus is adjustable from the horizontal within and up to approximately 90 degrees relative to seat 3.

FIG. 13 provides a detailed view of the attachment of the frame members at the rear of the frame. Right horizontal support member 25*b*, diagonal support member 26*b*, vertical support member 27*b* and lateral support member 30*b* are all rigidly attached to one another adjacent to P1*b*. The rearward ends of the left and right lateral support members are provided with extensions 33*a* and 33*b* which serve as the point of attachment of the rear wheel assembly 8.

Figure 2:
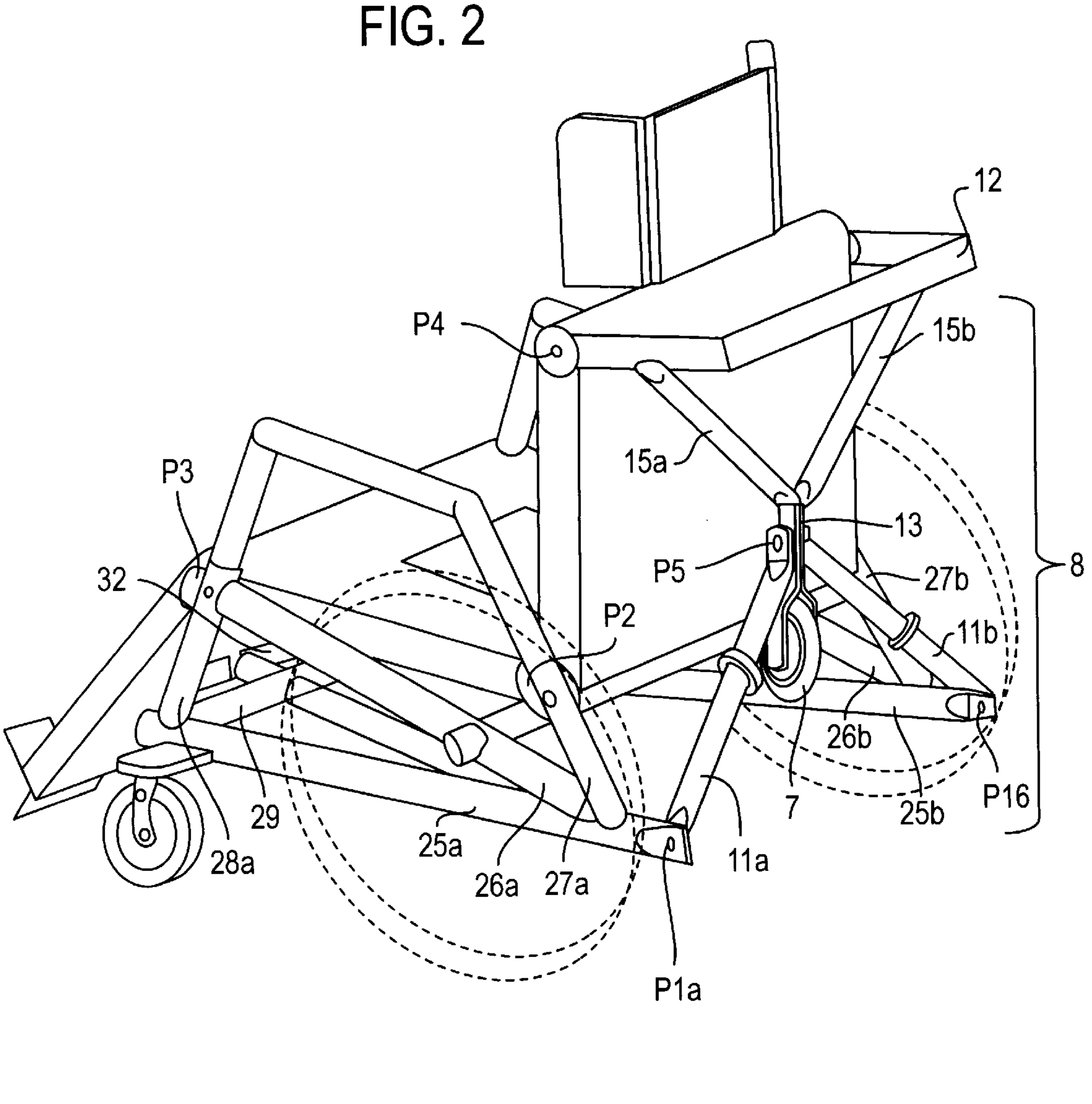
FIG. 2 shows a three dimensional rear perspective view of an embodiment of the apparatus with the position of the wheels shown in dashed lines.
Figure 3:
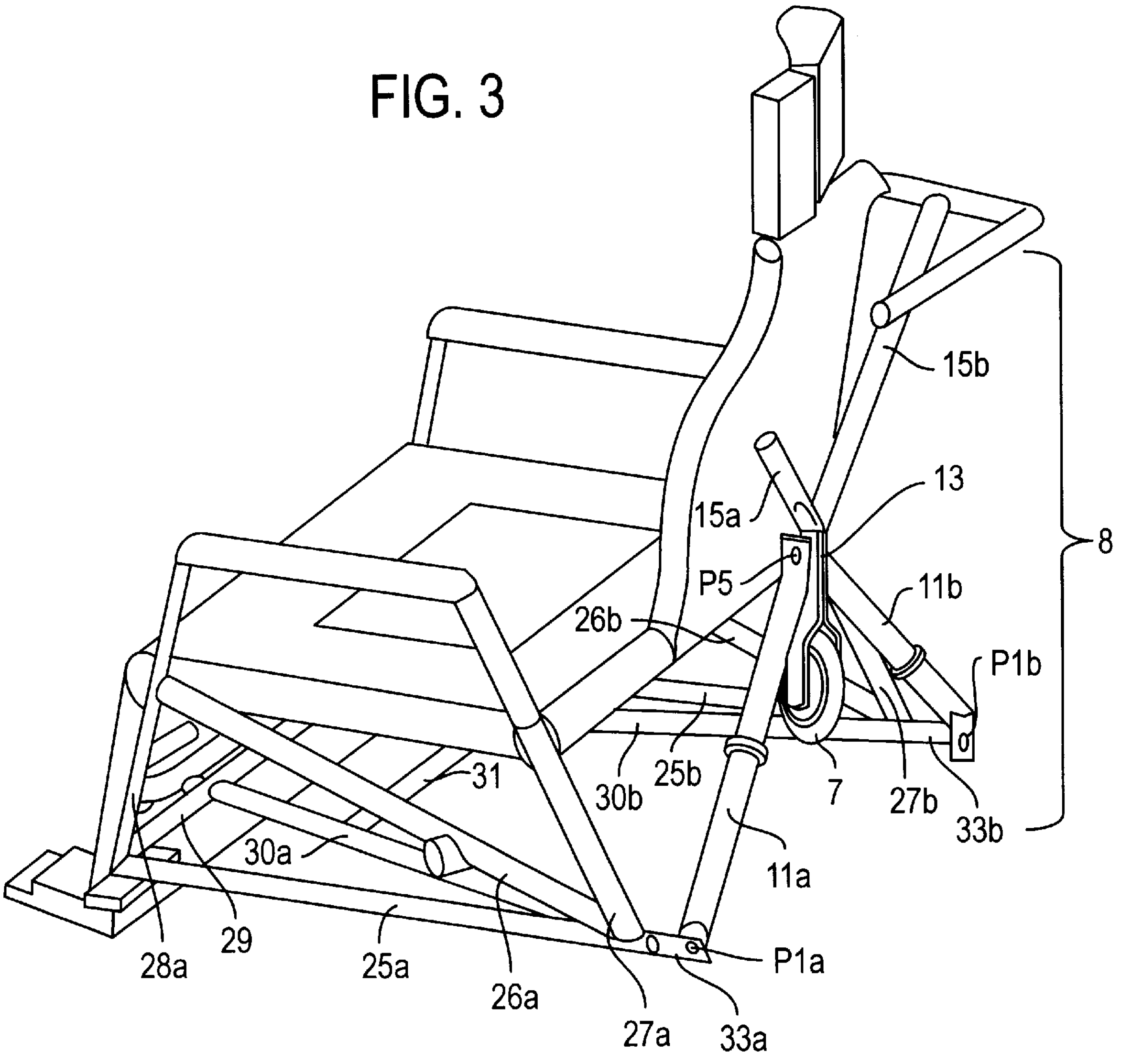
FIG. 3 shows a three dimensional view of the apparatus with the tray removed and a portion of the backrest cut away.
Figure 4:
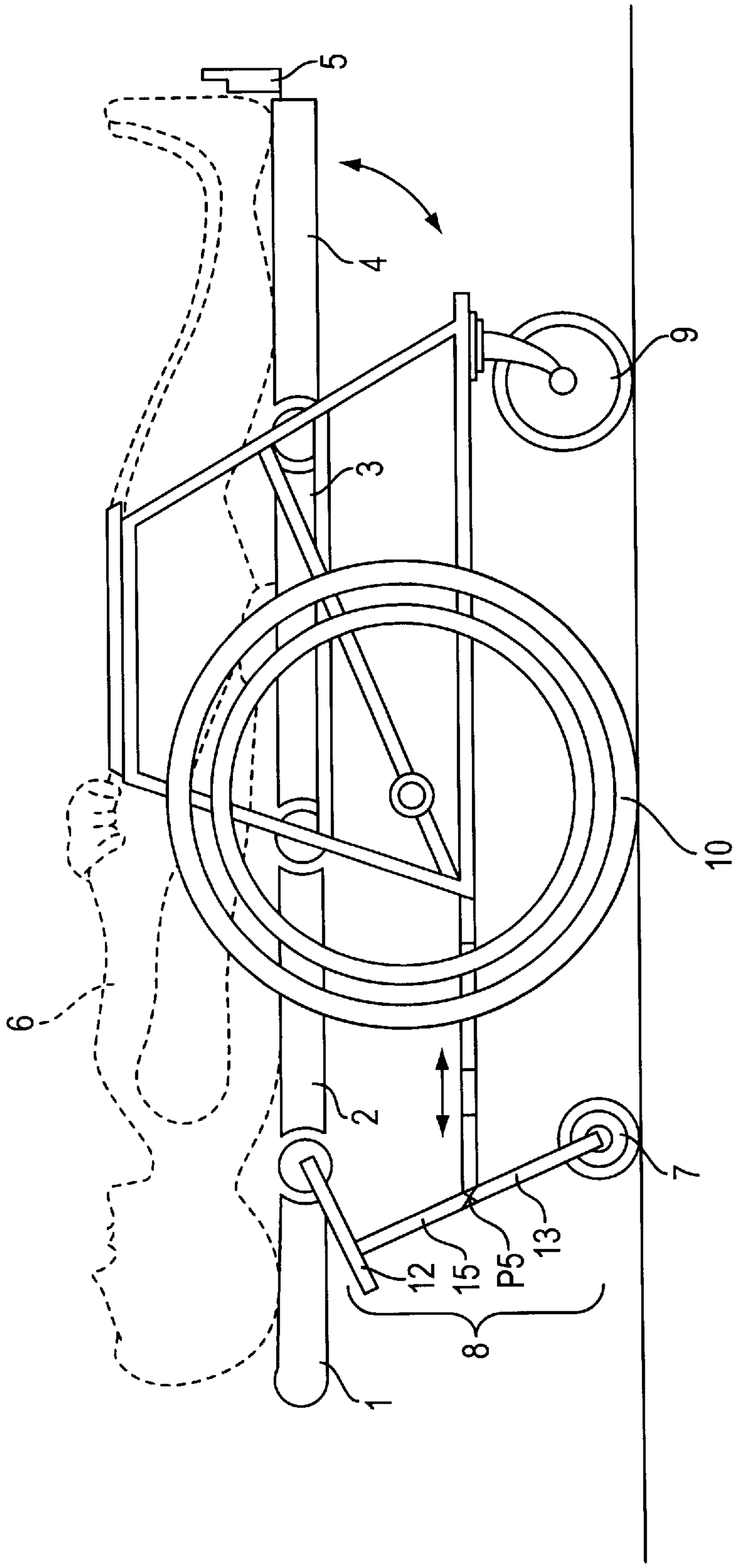
FIG. 4 shows a side elevational view of an embodiment of the apparatus according to the invention in the reclined position.

Another aspect of the invention is a retractable rear wheel assembly 8 as illustrated by FIGS. 2–5. The wheel assembly 8 includes rear wheel 7 rotatably attached to one end of vertical member 13. At its other end, vertical member 13 is attached to handlebar, or upper member 12 via left and right rear wheel attachment members 15*a* and 15*b*. The rear wheel attachment members 15*a* and 15*b* are rigidly attached to the handlebar 12, and the vertical member 13 is rigidly attached to the left and right rear wheel attachment members. The handlebar 12 is preferably connected to the backrest/headrest junction at P4 and pivots with respect to the plane of the backrest when moving from the wheelchair configuration to the sleeper configuration. Two tension loaded (spring-loaded) stabilizing bars or lower or H-channel members, 11*a* and 11*b* (FIG. 3), are pivotally connected at one end to vertical member 13 at P5. At their opposite ends, bars 11*a* and 11*b* are pivotally attached to extensions 33*a* and 33*b* opposite one another at P1*a* and P1*b*. The wheel assembly 8 is designed such that the tension loaded members 11*a* and 11*b* may retract within themselves in their own hollow section framing members to facilitate retractable folding. Bars 11*a* and 11*b* retract when folding from the sleeper position to the wheelchair position and extend when moving from the wheelchair position to the sleeper position. A comparison of FIGS. 2 and 4 will facilitate understanding of the mechanism of action of the rear wheel assembly. In FIG. 2 the assembly is retracted against the rear of backrest 2. Springs inside stabilizing bars 11*a* and 11*b* push the rigid structure formed by the handlebar 12, the rear wheel attachment members 15*a* and 15*b* and the vertical member 13 against the backrest 2 thereby securing the rigid structure in place. To convert to the sleeper position shown in FIG. 4, the wheel assembly 8 is pivoted at P4, P5 and P1 while the backrest 2 is lowered from the vertical position in FIG. 2 to the horizontal position in FIG. 4. The rear wheel assembly is locked into place by means of springs within the members 11*a* and 11*b*. Optionally, the rear wheel assembly may be provided with shock absorbers inside members 11*a* and 11*b* to control the rear wheel assembly during movements. Any known pivoting means may be utilized in the depicted couplings, such as a screw type, which may screw through the extensions 33*a* and 33*b* and into the spring loaded bars 11*a* and 11*b* at P1*a* and P1*b*. Optionally, bolts or pins may be fitted through and fixed with nuts or clips. Those skilled in the art will recognize that any means that permits the required movements, i.e. the pivoting of the stabilizing members 11 relative to the extensions 33 and vertical member 13 may be used. Handlebar 12 attached at point P4 may also be used to propel the invention in the wheelchair position.

Figure 5:
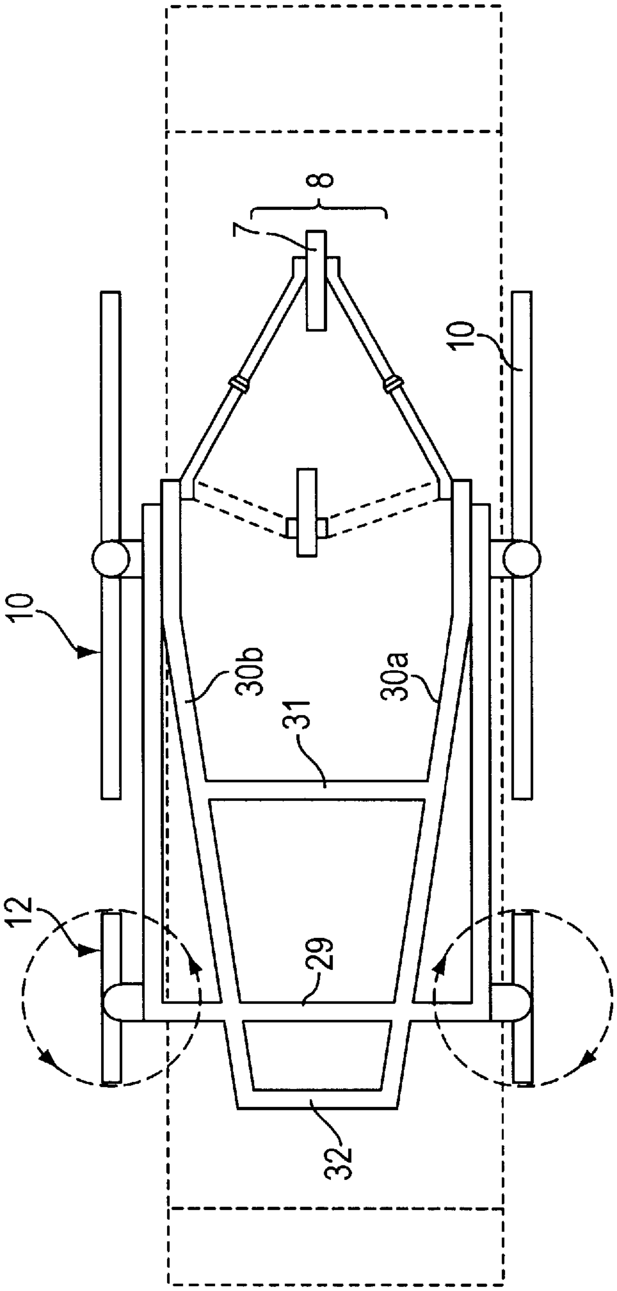
FIG. 5 shows an overhead view of the frame and wheel assembly of an embodiment of the apparatus according to the invention.

FIG. 5 shows a top view of the rear wheel assembly and frame in the reclined position with the seat and backrest portions removed. When in use, the rear wheel assembly 8 is such that the wheel is center aligned with respect to the pair of large mid-mounted center wheels 10. When not in use, the rear wheel assembly 8 is folded inward as shown in dashed lines so as not to interfere with the apparatus in the wheelchair position. FIG. 5 also shows the positions of the stabilizing bars 30*a* and 30*b*, the medial transverse member 31, the front horizontal support member 29, and the forward transverse member 32. The relative positions of the center wheels 10 and the front wheels 9 are also indicated. The front wheels are capable of being swiveled through 360 degrees as indicated by the arrows. This increases the maneuverability of the apparatus.

Figure 7:
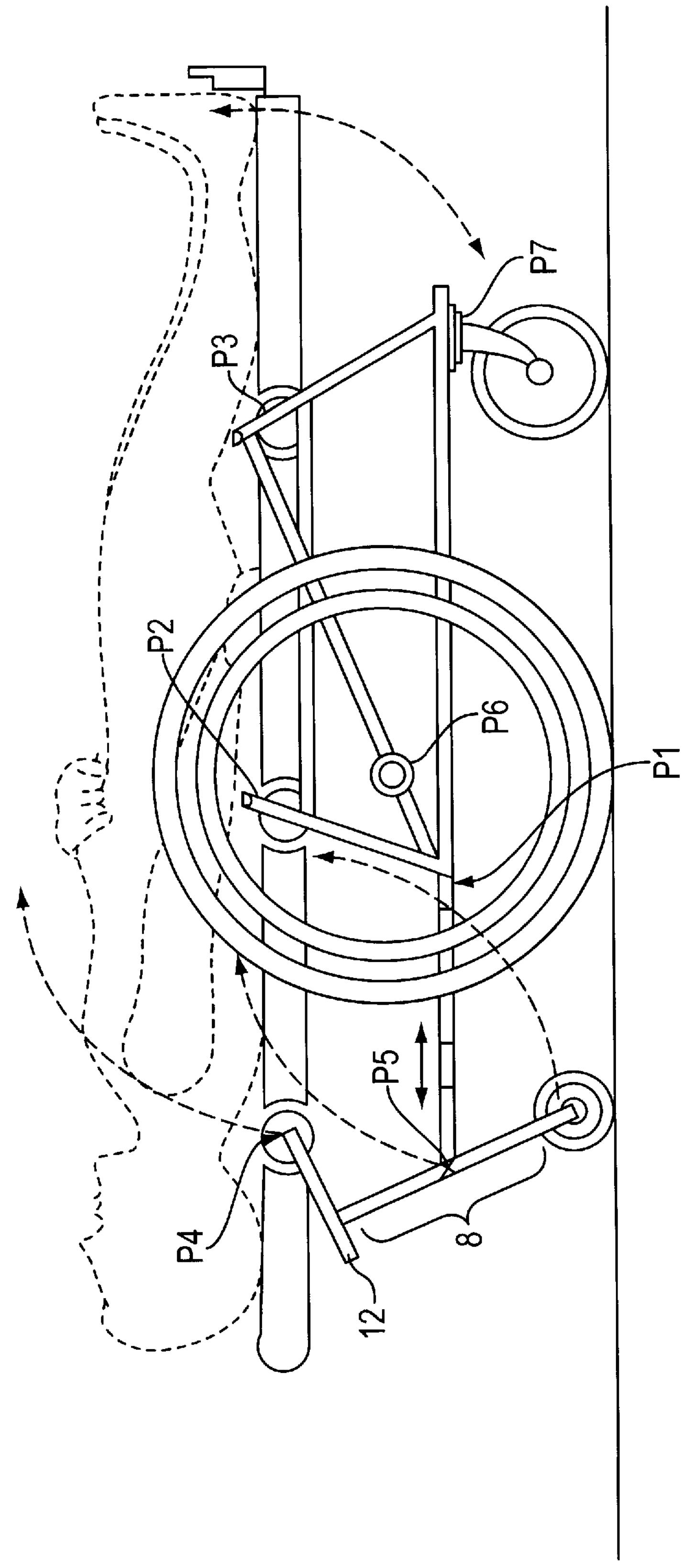
FIG. 7 corresponds to FIG. 4, additionally showing movements of the various movable components of the apparatus of the present invention and showing pivot points.

FIG. 7 shows the apparatus prepared for transferring the occupant. The armrest has been removed from the right side of the apparatus to facilitate lateral movement from the apparatus. The transfer of the occupant is easily accomplished without the necessity of lifting the occupant over the armrest. FIG. 6 shows the left side arm rest removed and also shows the configuration of the headrest when the portions 1*b* and 1*c* have been moved forward to provide lateral support for the head of the occupant.

FIG. 7 illustrates the pivoting points of the present invention i.e., points P1 through P7. The actual arcs are scribed to show the paths of travel of the various swing arms. P1 is the position at which the spring loaded stabilizer bars 11*a* and 11*b* are pivotally attached to the extension 33*a* and 33*b*. P2 is the position at which the backrest 2 is pivotally attached to the seat 3. P3 is the position at which the leg rests 5*a* and 5*b* are pivotally attached to the seat 3. P4 is the position at which the handlebar 12 is pivotally attached to the backrest 2. P5 is the position at which the spring loaded stabilizer 11*a* and 11*b* are pivotally attached to the vertical member 13. P6 is the position at which the center wheels 10 are attached to the diagonal support member 26. P7 is the position at which the front wheels 9 are attached to the front horizontal support member 29.

Figure 8:
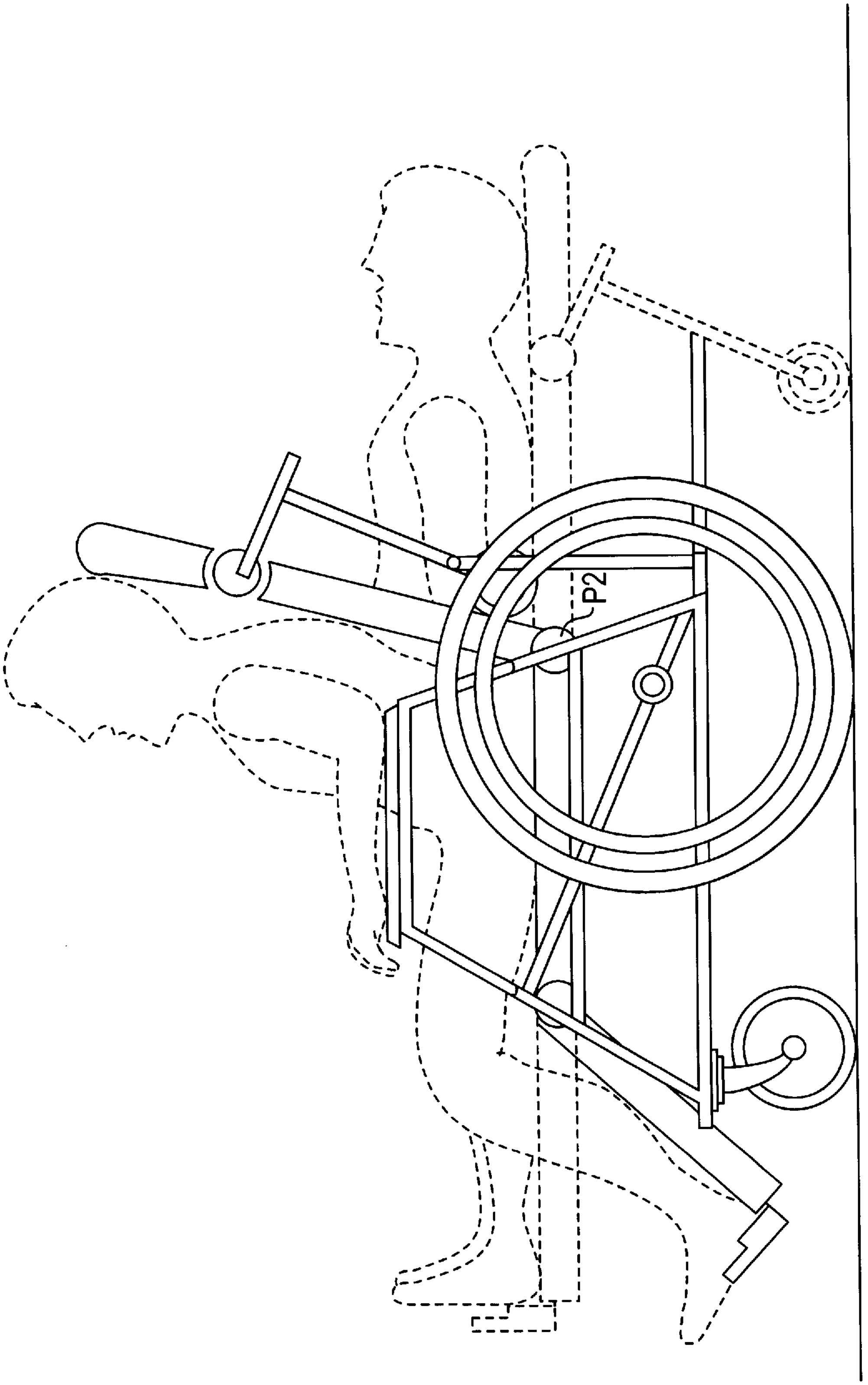
FIG. 8 shows a side elevational view of an embodiment of the apparatus according to the invention in the upright position.

FIG. 8 shows the position of the back rest in the wheelchair position. The position of the backrest when in the sleeper position is shown in dashed lines. The back rest is hinged to the rear parts of the seat portion at position P2. Optionally, P2 may be formed by means of a continuous hinge such as a piano type hinge in order to enhance the structural stability of the present apparatus. All portions that will be in contact with the patient may be cushioned or padded appropriately for ease and comfort.

Figure 9:
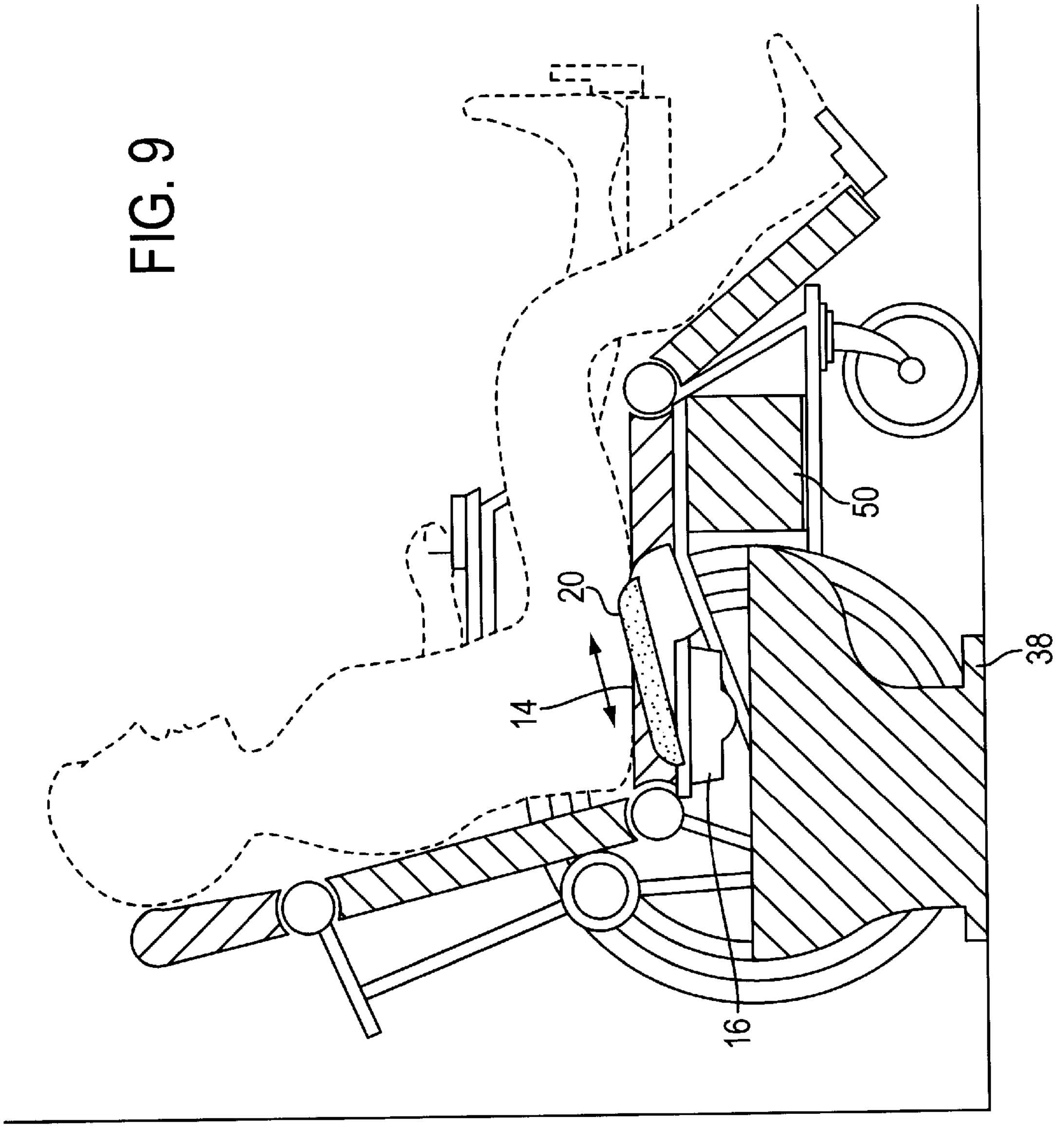
FIG. 9 shows a cross sectional view of the present invention along the plain X—X of FIG. 6.

Referring to FIG. 9, the unique potty assembly 14 of the present invention is shown in cross section along plane X—X of FIG. 6 and relatively positioned over a commode 38. The potty assembly 14 is shown in detail in FIGS. 10A, 10B and 10C. Referring to FIG. 10B the assembly 14 is seen to include a potty seat cover 20 and bedpan 16.

Figure 10A:
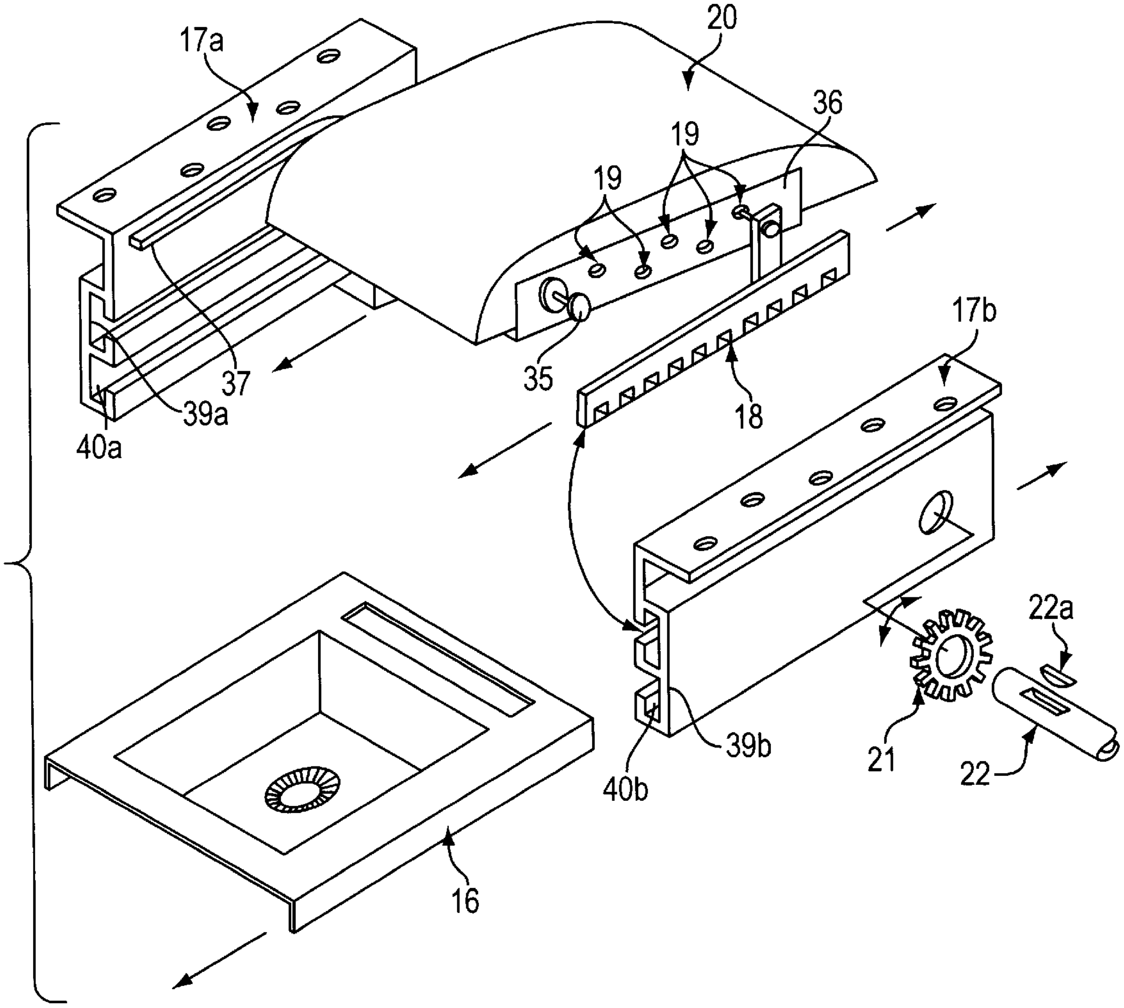
FIGS. 10A shows an exploded view of the potty opening assembly.
Figure 10B:
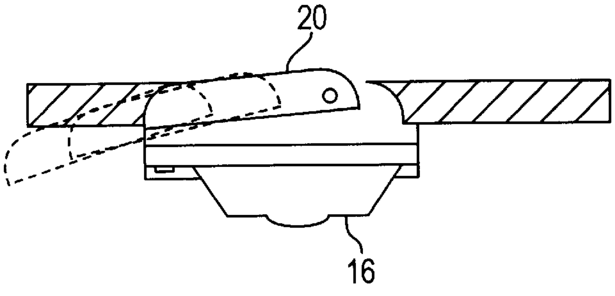
FIG. 10B shows the sequential movement pattern of the potty seat cover from a side view.
Figure 10C:
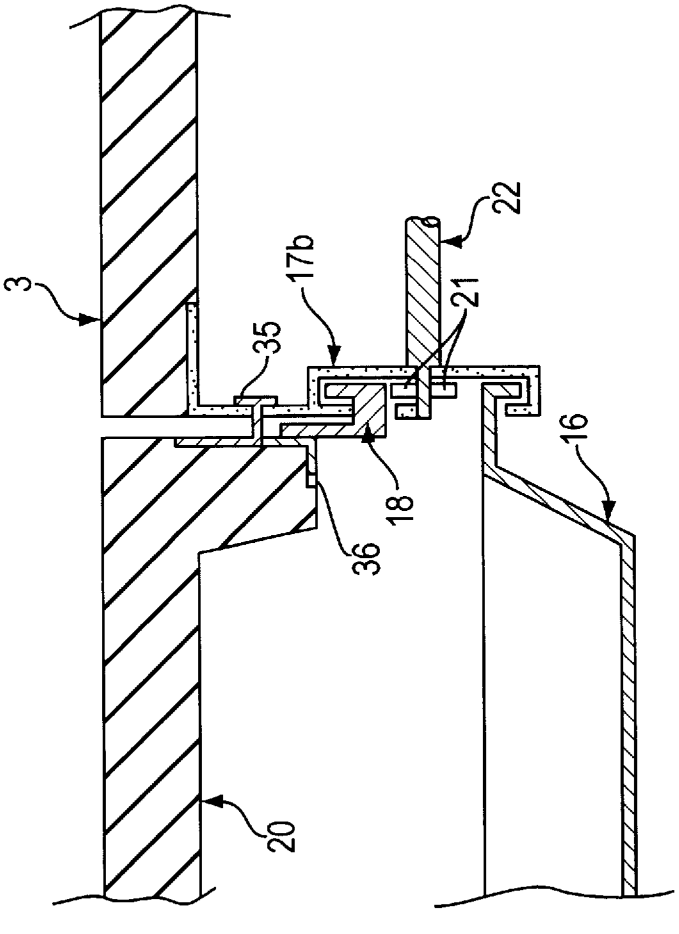
FIG. 10C shows an end view of the potty seat assembly.

FIG. 10A shows an exploded view of the potty assembly 14. FIG. 10B illustrates the sequential movement pattern of the potty door 20 in a sectional illustration between the closed and open positions. The bedpan 16 is designed to have a simple sumping effect to facilitate easy cleaning and/or emptying where the use of a lining is employed. Referring to FIG. 10A, reference numerals 17–20 are integral parts of the potty assembly unit framing. Two double-C grooved brackets 17*a* and 17*b* are attached to the bottom surface of the seat 3. Each bracket has upper channels, 39*a* and 39*b*, and lower channels, 40*a* and 40*b*. One skilled in the art will readily appreciate that both brackets 17*a* and 17*b* are provided with seat travel grooves and potty seat cover 20 is provided with channel bolts 35 on each side. The seat travel groove 37 serves as a channel in which channel bolt 35 travels when the potty seat cover 20 is moved to direct the retraction of the potty seat 20. In the view shown, only one seat travel groove 37 and one channel bolt 35 are shown. The channel bolt 35 is fixed to a channel bolt bracket 36 that is attached to the potty seat cover 20 with fastening means 19. The channel bolt 35 engages the seat travel groove 37 and controls the position of the potty seat cover 20 as the seat cover is operated. A toothed bracket 18 is pivotally attached at a single point to the channel bolt bracket 36. The toothed bracket is engaged by the potty seat control gear 21, and both the toothed bracket and the potty seat control gear are contained within the upper channel 39*b* of the double-C grooved bracket 17*b*. The potty seat control gear 21 is mounted on the potty seat control rod 22. One skilled in the art will appreciate that the potty seat control rod may be hand operated or motor driven. Operation of the potty seat control rod 22 when the potty seat cover 20 is in the closed position results in the rotation of gear 22. The toothed bracket 18 moves along the gear while remaining in a horizontal orientation as a result of traveling down the upper channel 39*b* of the double C bracket 17*b*. The potty seat cover 20 is pulled to the rear as a result of the movement of the toothed bracket 18. The orientation of the potty seat cover 20 with respect to the toothed bracket 18 changes as the potty seat cover 20 is moved to the rear. The rearmost portion of the potty seat cover is moved downward as a result of the movement of the channel bolt 35 in the seat travel groove. The seat travel groove is of such orientation and length that, at the limit of travel of the channel bolt 35, the potty seat cover 20 is moved out of the way making the bedpan 16 accessible to the occupant of the wheelchair. FIG. 10C is a transverse cross sectional view of the potty seat assembly.

Figure 11A:
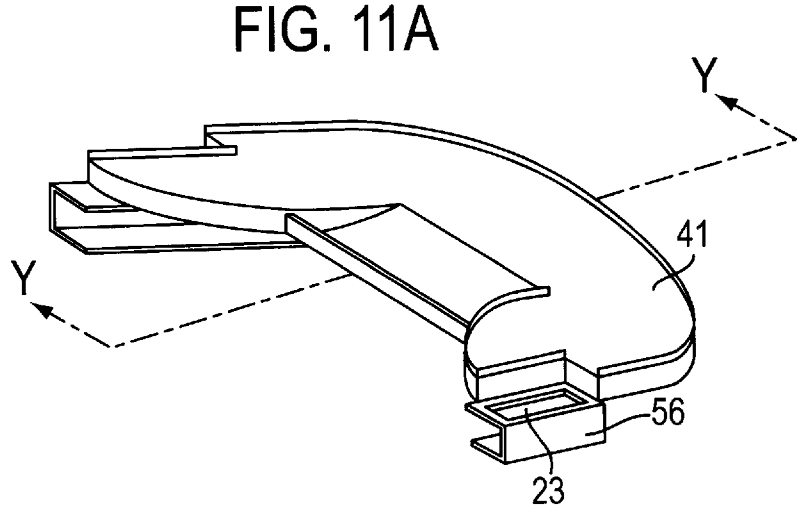
FIG. 11A shows details of the detachable tray assemblage in the writing/reading mode.
Figure 11B:
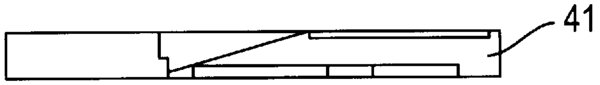
FIG. 11B shows a cross sectional view of the tray.
Figure 12:
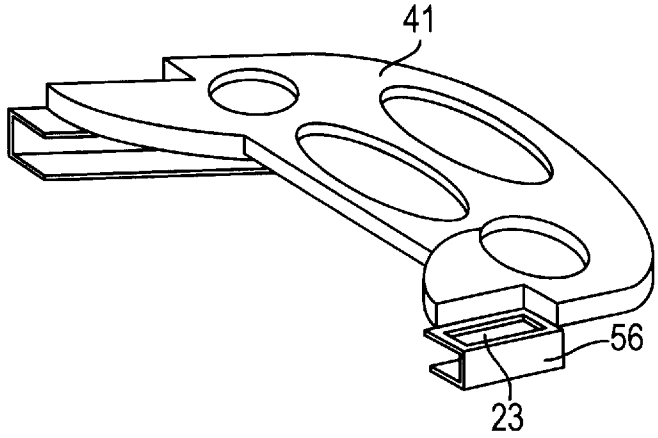
FIG. 12 shows details of the reverse, food service side of the tray shown in FIG. 11.

FIGS. 11 and 12 show the accessory food/writing tray 41. The tray is designed to serve a dual purpose, as on one side it serves the function of a food tray (FIG. 12), while on the reverse side it serves as a writing or laptop computer accommodating desk top (FIG. 11). This accessory should be preferably of a hardened material such as a thermoresin.

FIG. 13 shows the right side of the frame viewed from the left with the seat removed and provides detail views of several features of the apparatus according to the invention. FIG. 13 shows the arrangement of the horizontal 25*b,* diagonal 26*b,* rear vertical 27*b,* and lateral support 30*b* members of the frame as they come together at the rear of the frame. The extension 33*b* is attached at the end of the lateral support member 30*b*. This figure also show a portion of the tray 52. FIG. 14 shows illustrates that the removable arm rest 4 may be equipped with electrical connectors 24. FIGS. 11A shows wiring 54 may be fed through the frame members in order to connect the optional battery 50 when the apparatus is electric powered. FIG. 15B shows that wiring 54 may terminate in plug 58 to permit the apparatus to be powered from a wall socket.

FIG. 16 shows the food tray/writing accessory 41 attached to the arm rests 4 of the apparatus of the present invention and as well a possible location of the electrical control panel 23. The electrical control panel may be provided with buttons, switches or other standard electrical controls. The arm rests are designed to be detachable from the main framework of the present invention. The lower ends of the arm rests may be fitted with electrical connectors in the form of male/female electrical connectors 24. The wiring may be fed through the frame members to the electrical connectors 24 at the bases of the arm rest 4. Alternatively, the wiring may be fastened to the exteriors of the frame members by clips or the like. Optionally, the control panel may be operated using mechanisms specially adapted for use by handicapped individuals, such as a breath operated control mechanism or the like. The tray accessory is fastened by means of hinged angled brackets 56. These brackets will be in place, encircling the control panel 23 as shown. The brackets 56 may be configured to frictionally retain the tray on the arm rests 4. Optionally, the brackets 56 may be equipped with a locking mechanism to positively engage the arm rest. In one embodiment, the brackets 56 may be removable to allow them to be fastened to either side of the tray 41. In this embodiment the brackets may be fastened to the tray by any suitable fastening device such as bolts, screws and the like. The tray may be slid onto the arm rests 4 from the front or may be adapted to be lowered onto the arm rests 4 from above. The arm rest 4 and tray 41 may both be fitted with electrical connectors to convey electrical power from the battery 50 to the tray 41. The tray 41 may be fitted with additional electrical connections designed to power devices including, but not limited to, lap top computers, radios, compact disc players, mobile telephones and other electrically powered devices. One skilled in the art will readily envision the various types of electrical devices that would promote the independence of the occupant and would adapt the tray 41 accordingly. The nature of the connectors (i.e. the number of pins) can be adapted to suit the various electrically controlled functions.

Figure 17:
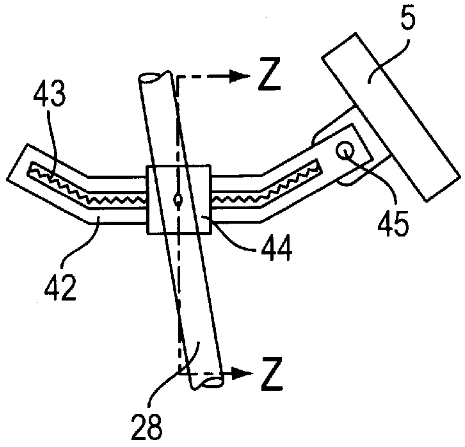
FIGS. 17 shows a side view of the adjusting mechanisms for the leg support portion.
Figure 18:
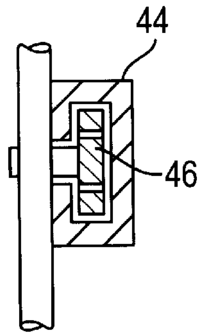
FIG. 18 shows an end view of the adjusting mechanism for the leg support portions.

FIGS. 17 and 18 show the mechanism that controls the adjustment of the leg supports 5 and related portions. The leg supports 5 are attached to a curved leg support adjusting bracket 42 via fastening means 45. The bracket is provided with teeth 43 and the bracket is adjusted by means of gear mechanism contained in a housing 44. The bracket is set in motion by small cogs that are powered either by manually or electrically operated mechanisms. FIG. 18 provides a cross sectional view along plane Z—Z of FIG. 17 of the leg support adjustment housing 44, including the leg support adjusting gear 46. The housing is mounted on the forward vertical support member 28. The angled brackets may be linked with the use of a cross member for synchronized movement.

Figure 19:
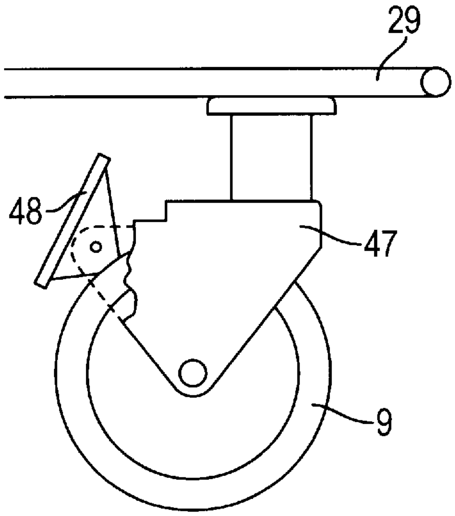
FIG. 19 shows the arrangements for forward swivelling wheels with locking mechanism.

FIG. 19 shows a detailed view of a forward swiveling wheel 9. The wheel is attached to the front horizontal support member 29 via a front wheel attachment member 47. The front wheel attachment member is pivotally connected to the front horizontal support member so as to permit the attachment member to rotate through 360 degrees with respect to the front horizontal support member. The front wheel attachment member may be provided with a locking device 48 to prevent movement of the apparatus when desired.

It should be understood that other hinging, pivoting, and relevant designs may be employed to enhance the structural stability of the present invention while still incorporating the aforementioned ideas and designs of the accompanying drawings and other illustrations.

The present wheelchair-sleeper apparatus offers many advantages over those already known in the prior art. First and foremost, the many novel features of this apparatus permit 24-hour usage during which 24-hour patient independence is promoted.

The major objectives of the present invention have been attained as outlined in the background statement given. The new wheelchair-sleeper is a greatly improved apparatus as compared to those apparatuses of the prior art. The present invention offers a wheelchair-sleeper of superior aesthetics and, as such, will be an apparatus of great novelty.

It goes without statement that, positive and progressive changes, modifications and alterations in the construction of the new present invention may be discussed and contemplated by those of ordinary knowledge and skill in the art without departing from the intended scope and ideas of theory presented. It is by these statements that it is intended that the present invention be limited only by the terms of the appended claims.

I claim:

1. An improved wheelchair-sleeper combined apparatus comprising:

a frame;

front wheels attached to said frame;

center wheels attached to said frame;

a seat attached to said frame;

armrests, comprising electrical connectors, attached to said frame a backrest attached to said seat;

a retractable wheel assembly for supporting said backrest in a reclined position, said retractable wheel assembly comprising an upper member attached to said backrest:

a first attachment member connected at a first end to said upper member:

a wheel-connecting member connected at a second end of said first attachment member:

a wheel connected to said wheel-connecting member, and a lower attachment member connected at a first end to said wheel-connecting member and connected at a second end to said frame;

an adjustable headrest attached to said backrest; and leg supports attached to said seat;

wherein said backrest and said leg supports may be brought into a horizontal position.

2. The wheelchair-sleeper apparatus of claim 1, wherein said lower attachment member is spring loaded.

3. The wheelchair-sleeper apparatus of claim 2, wherein said lower attachment member comprises a shock absorber.

4. The wheelchair-sleeper apparatus of claim 1, wherein said armrests are detachable.

5. The wheelchair-sleeper of claim 4, further comprising a tray removably attached to said armrests.

6. The wheelchair-sleeper of claim 5, wherein said tray is reversible.

7. The wheelchair-sleeper apparatus of claim 1, further comprising an electric power source connected to said frame.

8. The wheelchair-sleeper apparatus of claim 1, further comprising a tray removably attached to said armrests.

9. The wheelchair-sleeper apparatus of claim 8, wherein said tray is reversible.

10. The wheelchair-sleeper of claim 8, wherein said tray comprises electrical connectors.

11. The wheelchair-sleeper apparatus of claim 1, wherein said headrest portion comprises adjustable lateral support flaps.

12. The wheelchair-sleeper apparatus of claim 1, wherein said leg supports may be adjusted independently of each other.

13. An improved wheelchair-sleeper combined apparatus comprising:

a frame;

front wheels attached to said frame;

center wheels attached to said frame;

a seat attached to said frame and defining an opening for a potty;

a retractable potty cover attached to said seat;

a backrest attached to said seat;

a retractable wheel assembly for supporting said backrest in a reclined position, said retractable wheel assembly comprising an upper member attached to said backrest;

a first attachment member connected at a first end to said upper member;

a wheel-connecting member connected at a second end of said first attachment member;

a wheel connected to said wheel-connecting member; and a lower attachment member connected at a first end to said wheel-connecting member and connected at a second end to said frame;

an adjustable headrest attached to said backrest; and leg supports attached to said seat;

wherein said backrest and said leg supports may be brought into a horizontal position.

14. The wheelchair-sleeper apparatus of claim 13, further comprising a potty cover retracting apparatus attached to said seat.

15. The wheelchair-sleeper apparatus of claim 14, said potty cover retracting apparatus comprising:

a bracket attached to said seat and defining a retractable potty cover travel groove;

a retractable potty seat travel groove pin attached to said potty cover and slidably engaged in said groove;

a toothed drive bracket attached to said potty cover;

a potty cover drive gear engaged in said toothed drive bracket; and a drive shaft attached to said potty cover drive gear.

* * * * *